(12) United States Patent
Wehrli

(10) Patent No.: US 12,429,119 B2
(45) Date of Patent: Sep. 30, 2025

(54) ELECTRIC CYLINDER, ELECTRIC CYLINDER HAVING A MAGNET FOR DETERMINING THE POSITON OF A ROTARY ELEMENT OF AN ELECTRIC CYLINDER AND USE OF A MAGNET FOR DETERMINING THE POSITION OF A ROTARY ELEMENT

(71) Applicant: Cyltronic AG, Winterthur (CH)

(72) Inventor: Jeremias Wehrli, Winterthur (CH)

(73) Assignee: Cyltronic AG, Winterthur (CH)

( * ) Notice: Subject to any disclaimer, the term of this patent is extended or adjusted under 35 U.S.C. 154(b) by 0 days.

(21) Appl. No.: 18/249,823

(22) PCT Filed: Oct. 21, 2021

(86) PCT No.: PCT/EP2021/079161
§ 371 (c)(1),
(2) Date: Apr. 20, 2023

(87) PCT Pub. No.: WO2022/084427
PCT Pub. Date: Apr. 28, 2022

(65) Prior Publication Data
US 2023/0383824 A1   Nov. 30, 2023

(30) Foreign Application Priority Data

Oct. 22, 2020   (EP) .................................... 20203317

(51) Int. Cl.
*F16H 25/24*   (2006.01)
*F16H 25/20*   (2006.01)
(Continued)

(52) U.S. Cl.
CPC ......... *F16H 25/2015* (2013.01); *F16H 25/24* (2013.01); *G01B 7/30* (2013.01);
(Continued)

(58) Field of Classification Search
CPC ......... F16H 25/2015; F16H 2025/2075; F16H 2025/2436; F16H 2025/204
See application file for complete search history.

(56) References Cited

U.S. PATENT DOCUMENTS 4,795,931 A      1/1989  Sturm
6,392,322 B1 *   5/2002  Mares ............... H02K 11/33
                                              310/12.32

(Continued)

FOREIGN PATENT DOCUMENTS

DE  10 2007 038 841 A1    2/2009
EP       0 247 301 A2    12/1987
(Continued)

OTHER PUBLICATIONS

European Search Report Corresponding to 20203317 mailed Mar. 23, 2021.

(Continued)

Primary Examiner — Gregory Robert Weber
(74) Attorney, Agent, or Firm — Finch & Maloney PLLC

(57) ABSTRACT

The invention relates to an electric cylinder with a motor, control device and spindle device arranged inside the housing for generating a linear movement of the extending element. The rotor of the motor and the rotating element of the spindle device have the same axis of rotation. All components of the electric cylinder are arranged in a housing to save space, and the control device comprises a printed circuit board for motor control.

18 Claims, 6 Drawing Sheets

(51) Int. Cl.
  *G01B 7/30* (2006.01)
  *H02K 7/06* (2006.01)
  *H02K 11/21* (2016.01)
  *H02K 11/30* (2016.01)

(52) U.S. Cl.
  CPC .............. *H02K 7/06* (2013.01); *H02K 11/21* (2016.01); *H02K 11/30* (2016.01); *F16H 2025/2031* (2013.01); *F16H 2025/2075* (2013.01); *H02K 2211/03* (2013.01)

(56) References Cited

U.S. PATENT DOCUMENTS

| | | | | |
|---|---|---|---|---|
| 7,932,473 | B2* | 4/2011 | Sorensen | A61G 7/018 |
| | | | | 200/61.91 |
| 8,400,096 | B2* | 3/2013 | Miyashita | G01D 5/2451 |
| | | | | 318/602 |
| 8,572,894 | B2 | 11/2013 | Busch | |
| 8,978,496 | B2 | 3/2015 | Lee | |
| 9,482,327 | B2* | 11/2016 | Kondo | F16H 25/2204 |
| 10,563,742 | B2* | 2/2020 | Daniel | F16H 25/24 |
| 2016/0036281 | A1* | 2/2016 | Nakano | H02K 29/03 |
| | | | | 310/68 D |

FOREIGN PATENT DOCUMENTS

| | | |
|---|---|---|
| EP | 3 429 065 A1 | 1/2019 |
| WO | 2011/057632 A1 | 5/2011 |
| WO | WO-2015091887 A2 * 6/2015 | ............ F16C 13/006 |
| WO | 2019/193716 A1 | 10/2019 |

OTHER PUBLICATIONS

International Search Report Corresponding to PCT/EP2021/079161 mailed Nov. 17, 2021.
Written Opinion Corresponding to PCT/EP2021/079161 mailed Nov. 17, 2021.

* cited by examiner

ELECTRIC CYLINDER, ELECTRIC CYLINDER HAVING A MAGNET FOR DETERMINING THE POSITON OF A ROTARY ELEMENT OF AN ELECTRIC CYLINDER AND USE OF A MAGNET FOR DETERMINING THE POSITION OF A ROTARY ELEMENT

The invention relates to an electric cylinder and an electric cylinder with magnet for determining an angular position and axial position of an extending element.

This application is a National Stage completion of PCT/EP2021/079161 filed Oct. 21, 2021, which claims priority from European patent application 20203317.1 filed Oct. 22, 2020.

FIELD OF THE INVENTION

The invention relates to an electric cylinder and an electric cylinder with magnet for determining an angular position and axial position of an extending element.

BACKGROUND OF THE INVENTION

Known electric cylinders include an electric motor to control a stroke motion of an extending element by converting a rotary motion of a motor into a linear motion of the extending element.

Previous designs of electric cylinders are large in relation to their stroke length. Furthermore, electric cylinders are usually equipped with an external and/or large control device and the motor is either coaxial or laterally offset from the spindle device.

Therefore, current electric cylinders cannot simply be used for an existing pneumatic cylinder but require extensive adaptations. These criteria must also be combined in an electric cylinder design that is as inexpensive as possible.

In EP3429065A1, an electric cylinder is described. The motor, as well as the associated electronics and spindle devices and extending element are located in a housing for this purpose. An electric motor is used, which is mounted offset to the spindle device axis and drives the spindle device via a mechanical gear. This drive moves the spindle device and the extending element moves.

This device has the disadvantage that it is not space-saving and thus is not competitive with established pneumatic cylinders.

SUMMARY OF THE INVENTION

It is therefore an object of the invention to overcome these disadvantages of the prior art and to develop an electric cylinder which allows a compact design and can be used as an alternative to pneumatic cylinders.

The object is solved by an electric cylinder according to the independent claims. In particular, the object is solved by an electric cylinder comprising a motor with a stator and a rotor, a spindle device with a rotating element and an extending element, a control device and a housing with a housing interior. The control device controls the motor. The rotor and the rotating element have the same axis of rotation, so that the motor drives the spindle device. Preferably, the rotor is fixed to the rotating element. The control device comprises a printed circuit board for motor control, wherein the motor, the rotating element and the control device and in particular the spindle device are arranged in the housing interior.

Such an electric cylinder has a very space-saving design and does not require an external control system.

The printed circuit board may be of rigid design. Furthermore, exactly one printed circuit board may be provided.

The use of exactly one rigid printed circuit board leads to a space saving.

In this context, the term "rigid printed circuit board" refers to a printed circuit board that is not plastically deformable and, in particular, has a flat planar surface on which the electronic components can be mounted.

Mounting a printed circuit board under one of the sides of the electric cylinder requires that the control device be optimized with respect to the limited space of the housing interior, and that all electronic components can be mounted on a printed circuit board while keeping the dimensions of the electric cylinder, including the arrangement of the printed circuit board, as small as possible. In addition, such a printed circuit board in the housing facilitates maintenance, reduces production costs and enables a smaller housing. Furthermore, the arrangement of such a printed circuit board enables a short connection to the motor, which positively influences the electromagnetic compatibility behavior. In addition, the printed circuit board and its electronic components are arranged in such a way that the moving components, such as the extending element or the spindle nut, have the best possible electromagnetic compatibility with them.

The rotor and the rotating element also have the same axis of rotation. This has the advantage that no additional mechanical transmission is required and the motor can be mounted directly behind or coaxial to the rotating element, which means further space and cost savings.

Preferably fixing the rotor on the rotating element offers the advantage of saving a mechanical gear or other transmission elements such as a coupling.

This has the consequence that the bearing of the spindle device is therefore also the bearing of the motor, and thus fewer components are needed and costs are minimized.

The accommodation of all components for an electric cylinder in a housing in combination with space-saving construction offers a cost-effective design of an electric cylinder that can be used analogously to established pneumatic cylinders.

The spindle device of the electric cylinder preferably comprises a spindle nut which engages in the thread of the rotating element and is rigidly connected to the extending element by means of a thread on the spindle nut, without an additional connecting element and converts the rotary movement of the rotating element into an axial extending movement of the extending element.

This design also saves a lot of space and minimizes wear as much as possible.

The electric cylinder preferably comprises a torque support between the spindle nut and the extending element. The torque support preferably consists of a metal ring and a plastic slider or a single plastic part.

This torque support serves to transmit the forces of the spindle device resulting from the torque to the slideway in the housing.

The printed circuit board of the electric cylinder preferably comprises, with respect to the height perpendicular to the plane of the printed circuit board, arranged small and large electronic components. At least one of these electronic components, preferably all large electronic components, in particular transistors and/or converters, are arranged at the edge of the printed circuit board, in particular at the edge of a longer side of the printed circuit board.

This offers the advantage that the printed circuit board takes up less space in the housing interior. To save space, it is important that the larger electronic components, in particular transistors and/or converters, can be arranged in a small space in the housing to ensure the smallest possible housing. Therefore, the electronic components are preferably mounted on the printed circuit board in such a way that they are located as far away from the spindle axis as possible and protrude into the housing interior to the sides of the spindle device, since space is available at this location. In terms of the printed circuit board, this means that the larger electronic components are mounted as far as possible on the edge of the longer sides of the rigid printed circuit board with the longest extension of the electronic components perpendicular to the printed circuit board.

The control device of the electric cylinder preferably comprises two connections. One connection is for power and voltage supply to the control device and one connection is for communication with the control device.

On the one hand, these connections have the advantage of ensuring a high degree of safety in the event of a defect or failure, since the power supply is independent of the control device. On the other hand, the connections of the control device are advantageously designed in such a way that they can be connected and operated in the same way as a pneumatic cylinder and can thus serve a wide range of applications without the disadvantage of having to rely on compressed air.

The control device of the electric cylinder preferably comprises an interaction element. This interaction element comprises adjustment elements and/or status display elements. The adjustment elements are used for speed adjustment and/or force adjustment directly on the cylinder.

An interaction element directly on the electric cylinder offers the advantage that no external electronics are required. The adjustment options are mounted directly on the electric cylinder in a similar way to the adjustment options of a pneumatic cylinder, so that direct control is possible without external electronics.

This has the advantage that any user can start up the electric cylinder without software knowledge, making it accessible for a variety of uses.

Possible elements that can be adjusted with the interaction element are: the potentiometers for the retraction and extension speed and the force. The commutation and regulation of the motor is then automatically adjusted by the control device.

Preferably, the interaction element has adjustment screws for the speed during extension and during retraction (Speed IN/OUT) and an adjustment screw for the force.

Preferably, the interaction element comprises state indicating elements that indicate the user's settings of the values and/or indicate the state of the device, preferably by means of lights, diodes, LEDs and/or a display.

This has the advantage of allowing the user of the cylinder to read the state of the electric cylinder via a visual output, without the need for external hardware or software.

These status indicators provide information of the electric cylinder through preferably LEDs. The interaction element is attached directly to the housing by fasteners, and preferably serves at least partially as a housing cover.

The electric cylinder preferably has connection elements.

At least one of the connection elements is arranged on the extending element. In particular, one connection element is formed on one or both end faces of the housing.

The connection elements offer advantages in terms of, in particular, standardized fastening options and flexible use of the electric cylinder.

The connection elements have the advantage that the electric cylinder can be equipped with an appropriate connection element depending on the problem. Analogous to a pneumatic cylinder, preferably for a 32 mm cylinder diameter, all mounting elements can be used. Thus, the electric cylinder is not only competitive with a pneumatic cylinder in terms of appearance, especially the connection elements (preferably according to DIN ISO 15552), but also in terms of application possibilities.

The housing of the electric cylinder is preferably so small that an orthogonal section to the axis of the rotary element through the electric cylinder is never wider than 150%, in particular 130%, further in particular 120%, of the outer diameter of the motor. Excluded from this are the connections protruding from the housing. By the outer diameter of the motor is meant the outer diameter of the outer part of the motor, i.e. either the stator as the outer part or the rotor as the outer part.

Thus, no part of the housing is very much wider than the motor. This has the advantage that the housing, despite internal mounting of all components, is very small.

The electric cylinder preferably has two ball bearings arranged coaxially with the rotating element, on both sides of the rotor.

This has the advantage that the rotor is well supported by the relatively wide bearing and at the same time a good support of the rotating element is given. This ensures a longer running time.

The housing of the electric cylinder has in cross-section a substantially polygonal, preferably substantially rectangular, in particular preferably substantially square housing and/or the body of the housing is made of an aluminum extrusion.

The polygonal shape has the advantage that it allows a printed circuit board to be accommodated in the housing interior in the most space-saving way possible, without enlarging the housing. The square shape is particularly suitable, as it also corresponds to the shape of a conventional pneumatic cylinder. The housing of an electric cylinder should ideally be made of a light but strong material. An aluminum extrusion has a low weight, is inexpensive, and is therefore very suitable. The use of an aluminum extrusion allows the electric cylinder to have a very compact design with the advantage of not having to use external electronics or even cooling. Nevertheless, the electric cylinder could very easily be provided with additional internal cooling, such as fans or heat exchangers, or external cooling, since the coils of the stator, which are heated during operation, are located outside the housing.

The size of the motor can thus be easily adjusted, which makes it easy to improve the heat dissipation of the motor. In addition, unlike pneumatic cylinders, no compression device with corresponding lines and valves is necessary. Also, unlike pneumatic cylinders, there is no loss of energy due to compression of air at the compressor. In addition, no components in the electric cylinder are cooled by strongly expanding air. Since the electric cylinder can nevertheless be used in the same way as pneumatic cylinders, it opens up many areas of application that are difficult to access and/or do not allow external components.

The electric cylinder is preferably characterized by the fact that the housing, in particular the housing and housing cover, has essentially the same cross-section over its entire length, except for the connections and status display elements.

Due to a constant cross-section, all components of the electric cylinder can be placed in the housing in a space-saving manner and an analogous shape and similar mass to pneumatic cylinders can be formed.

The housing of the electric cylinder shall also preferably include one body-side housing cover and two end-side housing covers. One of the end-face housing covers is also preferably the motor housing of the motor at the same time.

The printed circuit board can be covered with the body-side housing cover on which the interaction elements are arranged. For this purpose, the housing cover is preferably detachably fastened to the body of the housing, such as screwed on. This has the advantage of ensuring easily accessible access to the electronic components. In addition, the rigid printed circuit board can be easily replaced, or a defect in the interaction elements can be repaired. In addition, there is no need for complicated insertion of wiring through drilled holes and associated seals in order to insert components into the interior of the housing.

Mounting the motor inside the housing cover allows for a compact design, as the front housing cover is also the motor housing, saving space.

The housing cover of the motor may be formed in one piece so that the motor is located substantially entirely within the housing cover. Fasteners for attaching the housing cover to the housing may be arranged such that a connecting groove of the housing and housing cover is axially adjacent to the motor.

Furthermore, a bearing for supporting the spindle can be located in the housing cover. Thus, the spindle rotates without imbalance.

The motor thus drives the spindle directly, not the spindle nut.

Thus, the cover can be adapted to the dimensions of the rotor and/or stator and additional space can be saved in the housing interior, resulting in smaller outer dimensions of the cylinder.

The end cover with the opening for the extending element also includes a bearing and seal for the extending element. The seal prevents damage and contamination from dust, or dirt, as well as wear from humidity. The housing cover is attached to the housing by one or more fasteners and is preferably removable.

According to the current state of the art, a slide bearing is often placed in the space between the rotating element and the extending element at the end of the rotating element in order to better support the rotating element.

This has the disadvantage that the sliding bearing must absorb the friction of both the rotational and the translational motion and is thus subject to severe wear.

It is therefore an object of the invention to overcome these disadvantages in the prior art and to develop an electric cylinder which increases the durability of the rotating element and extending element in an electric cylinder.

An electric cylinder, preferably as previously described, includes a motor having a stator and a rotor, a spindle device having a rotating element and an extending element. The spindle device includes a combination bearing. Such a combination bearing comprises a plain bearing and a ball bearing. This combination bearing is arranged between the rotating element and the extending element, preferably on a side of the rotating element furthest from the motor.

The combination bearing thus increases the durability of the electric cylinder. This is especially an advantage over many other electric cylinders.

A great advantage is obtained when the combination bearing is placed as close as possible to the maximum distance from the motor between the rotating element and the extending element, since the longest lever arm is present there. Accordingly, the combination bearing is preferably arranged on the end face facing away from the motor between the rotating element and the extending element.

Preferably, the motor of the electric cylinder is a brushless motor, since it is subject to significantly less wear and has a longer service life.

Determining the axial position of the extending element and the angular position of the rotating element in electric cylinders is sometimes only possible with large components in the prior art and thus requires a lot of space. Determining the axial position and angular position should also allow conclusions to be drawn about the position of the rotor relative to the stator, since this has the advantage that the motor can be commutated and a brushless motor can be used.

According to a further aspect of the invention, it is therefore an object of the invention to overcome these disadvantages of the prior art and to develop an electric cylinder which provides a space-saving method of determining the axial position of the extending element and angular position of the rotating element.

The object is solved by an electric cylinder according to the independent claims.

The electric cylinder, in particular an electric cylinder as previously described, comprises a motor with a stator and a rotor, a spindle device with a rotating element and an extending element, in particular a control device, as well as at least one magnet, on or in an end face of the rotating element, and an electronic encoder device. The encoder device is arranged substantially axially to the axis of rotation of the rotating element. The encoder device is used to read the angular position of the magnet and/or to determine the axial position of the extending element.

This mounting of the encoder device and the magnet has the advantage that the position of the magnet can be read out in a very space-saving manner. In this context, it would also be conceivable to attach the magnet to the rotor if the rotor is not permanently connected to the rotating element. Preferably, however, the magnet is arranged on the axis of rotation of the rotating element, since this offers the advantage that no imbalance can occur. In this case, the magnet is designed so that the south pole of the magnet is arranged on one side of the axis of rotation and the north pole of the magnet is arranged on the other side of the axis of rotation, opposite the south pole.

With the help of a counter and the information about the thread of the spindle device, as well as the angular position of the magnet, the axial position of the extending element can now be determined by the control device and/or encoder device. This offers the advantage that the position of the extending element can be determined without the need for the readout device comprising magnet and encoder device to perform an axial movement along the axis of rotation of the rotating element.

In another embodiment, the magnet can also be mounted away from the axis of rotation, laterally on the face of the rotating element, while the encoder device is mounted centrally axially with respect to the rotating element. Accordingly, the information of the angular position results from the change of the direction of the magnetic field due to the rotation of the rotating element.

Preferably, the electric cylinder comprises a magnet having the north pole on one side radially away from the axis of rotation and, in particular, having the south pole radially on the opposite side of the axis of rotation.

Preferably, the magnet has a polarity orthogonal to the axis of the rotating element. This offers the advantage that it is placed centrally without displacing the center of gravity of the rotating element and can be read out easily. A diametral magnet is very suitable for this application, but other magnet shapes are also possible.

The installation of a magnet with encoder device for determining the angular position and axial position offers the advantage of a large saving of space, since the measurement of the axial position of the extending element, only by rotation of the magnet, takes place statically at the same place.

The object is further preferably solved by the use of a magnet on or in an end face of the rotating element, that the magnet with encoder device is used for detecting the rotational speed of the rotating element and/or commutation of the motor by means of the signal of the electronic encoder device and/or control device.

This has the advantage that the use of a brushless motor is possible by appropriate commutation and, in addition, no further sensor technology such as Hall sensors is required.

For commutation, the position/angular position of the rotor relative to the stator must be known at all times.

Since the rotor is preferably rigidly connected to the rotating element, and the magnet is rigidly connected to the rotating element, the angular position of the magnet also determines the position of the rotor. This has the advantage that the relative position of the rotor to the stationary stator can be measured at any time.

This offers the advantage that a brushless motor can be used. A brushless motor, preferably a BLDC motor, is more efficient than brushed motors or stepper motors, which have a high holding torque and are less dynamic, and has a longer life due to less wear. Commutation of the motor, i.e., energizing the correct coils at the correct time, must be accomplished through the electronic components of the control device and/or encoder device and the determined angular position.

BRIEF DESCRIPTION OF THE DRAWINGS

The invention is explained in more detail with reference to figures, which are merely examples of embodiments. They show.

Identical reference signs in the figures indicate identical components.

DETAILED DESCRIPTION OF THE PREFERRED EMBODIMENTS

Figure 1:
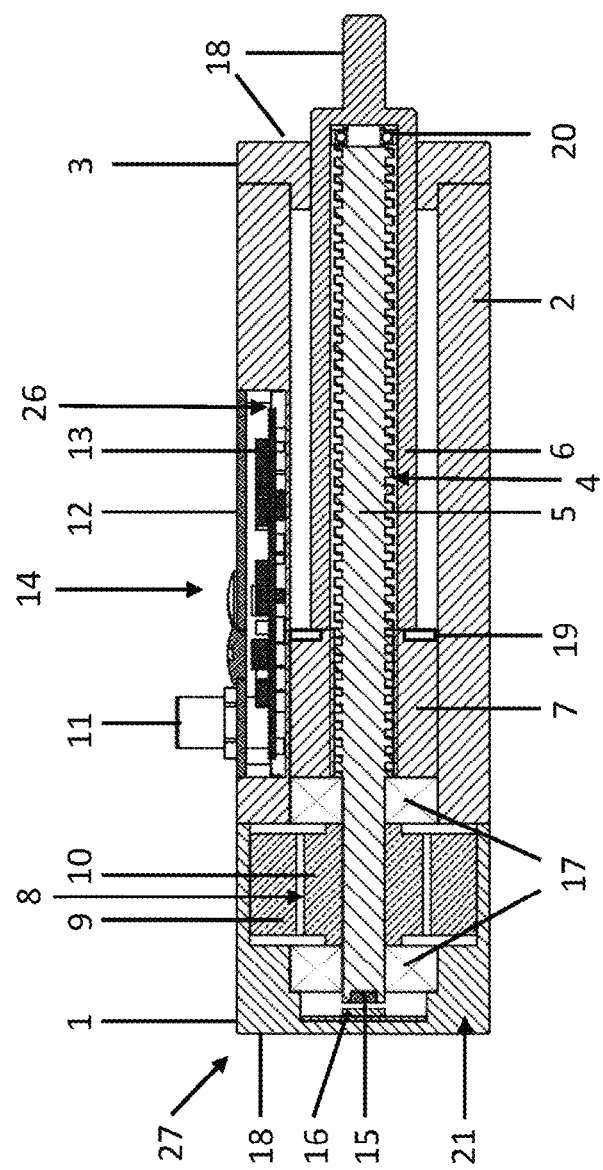
FIG. 1: a longitudinal section through an electric cylinder according to the invention.

FIG. 1 shows an electric cylinder 27 according to the invention with a rigid printed circuit board 13 and a control device 14. A motor 8 with stator 9 and rotor 10 and a spindle device 4 with rotating element 5 and extending element 6 are arranged in the housing interior 26. The housing interior 26 is closed off by the boundary of the housing 21 to the outside and all housing covers 1, 3 and 12. The opening through which the extending element protrudes from the electric cylinder in the front housing cover 3 also delimits the housing interior 26.

The housing cover 1 of the electric cylinder, which also forms the housing of the motor 8, also contains the magnet 15 and the encoder device 16 for reading the angular position and axial position of the extending element 6.

FIG. 1 also shows the spindle nut 7 and the corresponding position of the torque arm 19 and the use of a combination bearing 20, consisting of a sliding bearing and ball bearing, between the rotating element 5 and extending element 6, and the components of the control device 14: the rigid printed circuit board 13, the interaction element 12 and the connections 11.

Furthermore, FIG. 1 shows the arrangement of the motor 8 coaxial to the spindle device 4 inside the housing cover 1. The rotor, surrounded by two deep groove ball bearings 17 is in this embodiment rigidly connected to the rotating element 5 of the spindle device 4.

The housing covers 1 and 3 and the extending element 6 also include connection elements 18.

By energizing the coils of the stator 9 at the right time, the motor of the electric cylinder can convert current into a rotational movement of the rotor 8, which is supported by the deep groove ball bearings 17 on both sides. As a result of the rotational movement of the rotor, which is rigidly connected to the rotating element 5, the rotating element 5 consequently also rotates. In this embodiment, the rotating element 5 engages a spindle nut 7, which transmits the rotational movement to a translational movement of the extending element 6. The extending element 6 can only perform a translational movement out of or into the housing 21 and does not rotate. In this case, the two ball bearings around the rotor 17 and the combination bearing 20 at the front end of the rotating element 5 ensure that friction is minimized, the force is not greatly reduced, or parts wear out quickly. This translational motion allows the extending element 6, which protrudes through an opening in the front housing cover 3, to be moved out of and back into the housing cover 26. In the maximally retracted state of the extending element 6, the extending element 6 may partially extend out of the housing interior 26 as shown in FIG. 1. The speed, force, energization of the stator 9 and determination of the axial position of the extending element 6 and angular position are controlled or regulated by the control 14 and/or encoder device 16.

Figure 2:
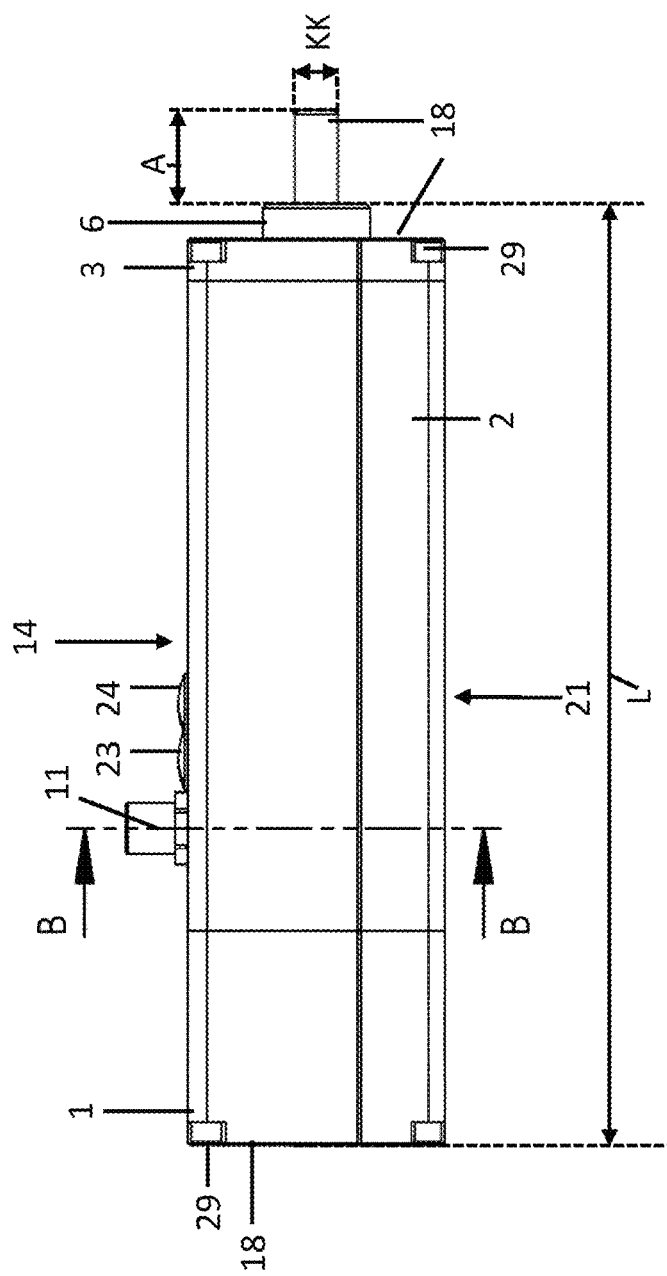
FIG. 2: an external view of the housing of the electric cylinder.
Figure 4:
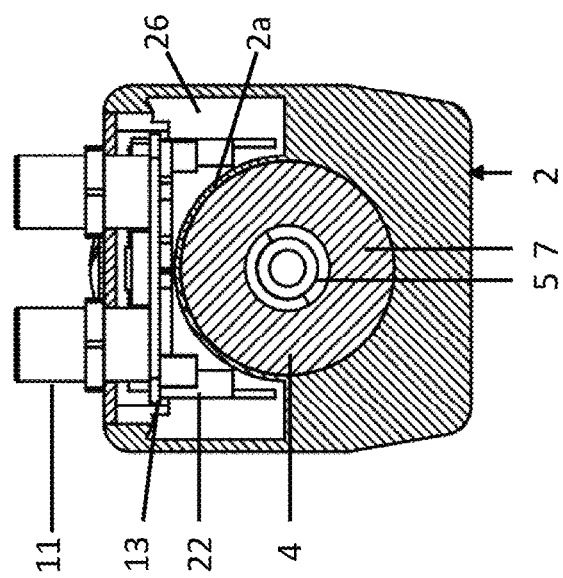
FIG. 4: a cross-section of the electric cylinder.

FIG. 2 shows the side view of the electric cylinder from FIG. 1. Furthermore, FIG. 2 shows the fastening of the rear housing cover 1 and front housing cover 3 with screws 29, preferably with threaded locking. The cross-section B of the electric cylinder is shown in FIG. 4. The thread dimension of the connection element 18 of the extending element 6 has been designated KK. The length A denotes the length of the connection element 18 of the extending element 6, outside the housing 21.

The length L is less than or equal to the following dimension: $L <= Lb+H$.

H denotes the maximum stroke length in millimeters and Lb, the length dependent on the cylinder force (Fmax), where the cylinder force (Fmax) represents the maximum force achievable by the electric cylinder 27, where Lb in particular concerns the following force-dependent expressions, which can be taken from the table.

TABLE

| Pneumatic cylinder pendant (mm) | Fmax (N) | $L_b$ (mm) | TG (mm) | RT | KK |
|---|---|---|---|---|---|
| 32 | 0-760 | 120 | 32.5 | M6 | M10 × 1.25 |
| 40 | 761-1180 | 135 | 38 | M6 | M12 × 1.25 |
| 50 | 1181-1870 | 143 | 46.5 | M8 | M16 × 1.5 |
| 63 | 1871-3020 | 158 | 56.5 | M8 | M16 × 1.5 |
| 80 | 3021-4710 | 174 | 72 | M10 | M20 × 1.5 |
| 100 | 4711-7360 | 189 | 89 | M10 | M20 × 1.5 |
| 125 | 7361-12060 | 225 | 110 | M12 | M27 × 2 |
| 160 | 12061-18850 | 260 | 140 | M16 | M36 × 2 |

The dimensions due to installation length, mounting options and sizes, are therefore very similar to those of pneumatic cylinders and preferably comply with the ISO 15552 standard. The designation "pneumatic cylinder counterpart" means that the values are to be understood as analogous to a pneumatic cylinder with such a piston diameter.

Figure 6:
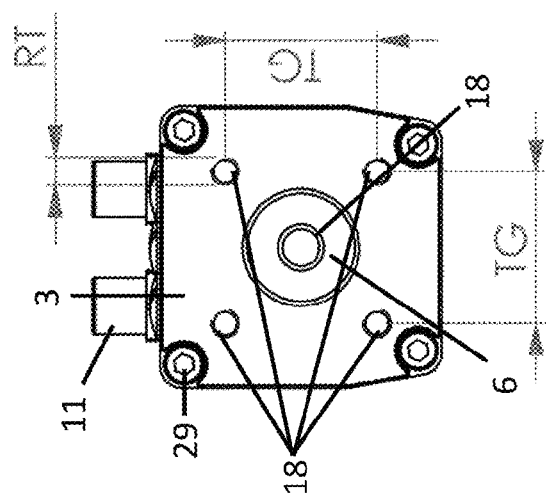
FIG. 6: an external view of the end face of the electric cylinder facing away from the motor.

The length TG is shown in FIG. 6.

Figure 3:
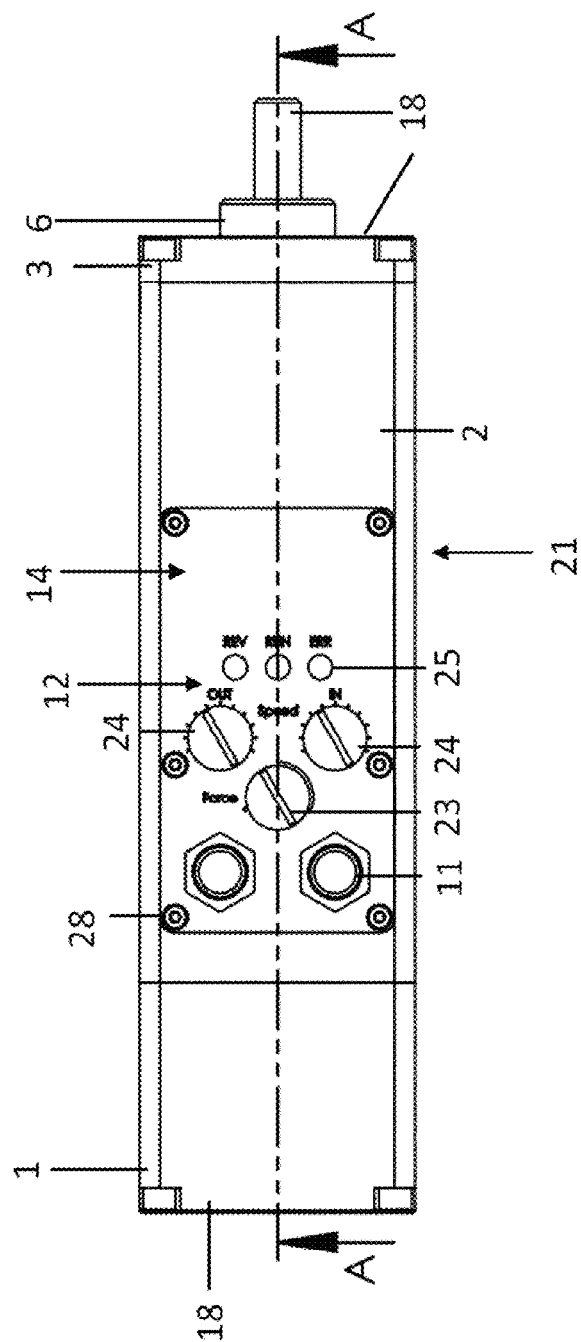
FIG. 3: an external view of the housing of the electric cylinder.

FIG. 3 shows the upper side of the electric cylinder 27 with the control device 14, consisting of the connections 11 and the interaction element 12. The interaction element 12 has adjustment elements 23, 24 and 25 for speed adjustment 24 and force adjustment 23, as well as status display elements in the form of lights 25, preferably LEDs. The adjustment elements 24 of the speed adjustment allow different settings when extending (OUT) and retracting (IN) the extending element 6. In this embodiment example, the housing cover on the body side is also the interaction element 12, which in this embodiment is fixed by 6 screws 28.

Furthermore, the longitudinal section A shown in FIG. 1 is shown here.

FIG. 4 shows the cross-section B of the electric cylinder 27 at the location of the connections 11 and the housing interior 26. Thus, on the one hand, the spindle device 4, as well as the rigid printed circuit board 13 can be seen. FIG. 4 shows the form in which the large electronic components 22 are arranged and project into the interior of the housing in order to save space. This space-saving design makes it possible to use only one rigid printed circuit board 13 of the control device 14 to enable the electric cylinder and its features to function.

Furthermore, a, preferably insulating, thermally conductive foil is applied to the electronic components 22 and ensures that the electronic components do not contact the housing.

The housing 2 also encloses the spindle device 4 to the side of the rigid printed circuit board 13 with a housing partition 2a, thus ensuring that possible inclusions of dust, impurities or moisture resulting from the extension and retraction of the extending element 6 cannot interfere with the control device 14.

The substantially square base of this embodiment of the electric cylinder has rounded corners and the sides extend slightly funnel-shaped to the opposite side of the electronics.

Figure 5:
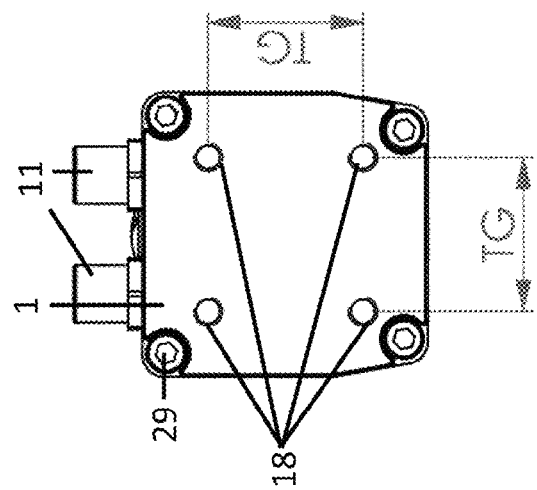
FIG. 5: an external view of the end face of the electric cylinder facing the motor.

FIG. 5 shows the rear end face of the electric cylinder 27. In this embodiment, the rear housing cover 1 is detachably secured by 4 screws 29 and has 4 connection elements 18 each in the form of holes with threads. The distance TG, referenced in the table, is shown between the connection elements 18 of the rear housing cover 1 and front housing cover 3 in FIG. 5.

FIG. 6 shows the front face of the electric cylinder 27 with front housing cover 3. The front housing cover 3 also has 4 connection elements 18.

Furthermore, FIG. 6 shows the connection element 18 of the extending element 6, in this embodiment as a thread.

The arrangement of the connection elements 18 have a diameter RT and are also arranged in a square in this essentially square design of the housing cover 1 and 3.

The invention claimed is:

1. An electric cylinder comprising a motor with a stator and a rotor, a spindle device with a rotating element and an extending element, and a control device, wherein the control device controls the motor, and a housing with a housing interior, wherein the rotor and the rotating element have the same axis of rotation, so that the motor drives the spindle device, wherein the control device comprises a printed circuit board for motor control, the motor, the rotating element, the control device and the spindle device being arranged in the housing interior, the printed circuit being offset from the spindle device in a direction perpendicular to the axis of rotation, wherein the housing of the electric cylinder is polygonal and made by aluminum extrusion and wherein a cross section of the electric cylinder orthogonal to the axis of rotation is never wider than 130% of the outer diameter of the motor.

2. The electric cylinder according to claim 1, wherein the spindle device comprises a spindle nut which engages with a first thread of the rotating element and is rigidly connected to the extending element by means of a second thread on the spindle nut, without an additional connecting element and converts the rotational movement of the rotating element into an axial extending movement of the extending element.

3. The electric cylinder according to claim 1, wherein the printed circuit board comprises small and large electronic components with respect to the height perpendicular to the plane of the printed circuit board, wherein at least one electronic component is arranged at the edge of the printed circuit board.

4. The electric cylinder according to claim 1, wherein the control device comprises a connection for power and voltage supply and a connection for communication with the control device.

5. The electric cylinder according to claim 1, wherein the control device comprises an interaction element, the interaction element comprising at least one of status display elements and adjustment elements for at least one of speed adjustment and force adjustment directly on the cylinder.

6. The electric cylinder according to claim 5, wherein the housing has the same cross-section over the entire length, apart from the connections and the status display elements.

7. The electric cylinder according to claim 1, wherein connection elements are provided, at least one of the connection elements being arranged on the extending element, and one connection element being formed on one or both end faces of the housing.

8. The electric cylinder according to claim 1, wherein a cross section of the electric cylinder orthogonal to the axis of the rotating element is never wider than 120% of the outer diameter of the motor, apart from connections protruding from the housing, which may be wider.

9. The electric cylinder according to claim 1, wherein the housing comprises a body-side housing cover and two end-side housing covers wherein one of the end-side housing covers is simultaneously a motor housing of the motor.

10. The electric cylinder according to claim 1, wherein the spindle device comprises a combination bearing, wherein the combination bearing comprises a plain bearing and a ball bearing arranged between the rotating element and the extending element.

11. The electric cylinder according to claim 10, wherein the combination bearing is arranged at a side of the rotating element with greatest distance to the motor.

12. The electric cylinder according to claim 1, wherein the rotor is fixed on the rotating element.

13. The electric cylinder according to claim 1, wherein the polygonal housing is rectangular or square shaped.

14. The electric cylinder according to claim 1, wherein the electric cylinder comprises at least one magnet on or in an end face of the rotating element, and an electronic encoder device coaxial to the axis of rotation of the rotating element for at least one of reading out the angular position of the magnet and determining the axial position of the extending element.

15. An electric cylinder comprising a motor with a stator and a rotor, a spindle device with a rotating element, an extending element, at least one magnet on or in an axial end face of the rotating element, and an electronic encoder device axial to the axis of rotation of the rotating element and axially spaced from the rotating element for at least one of reading out the angular position of the magnet and determining the axial position of the extending element, wherein the motor is arranged coaxially to the spindle device.

16. The electric cylinder according to claim 15, wherein the magnet has a north pole and the north pole is on one side radially away from the axis of rotation, such that a south pole of the magnet is arranged on one side of the axis of rotation and the north pole of the magnet is arranged on the other side of the axis of rotation, opposite the south pole.

17. The electric cylinder according to claim 15, wherein the magnet with the encoder device is for detecting the speed of rotation of the rotating element and/or commutation of the motor based on the signal from the electronic encoder device and/or control device.

18. The electric cylinder according to claim 15, wherein the electric cylinder comprises a control device.

* * * * *